F. C. STETTER.
AUTOMATIC LAWN SPRINKLER.
APPLICATION FILED NOV. 9, 1914.

1,146,663.

Patented July 13, 1915.

Witnesses

Inventor
F. C. Stetter,
By
Attorney

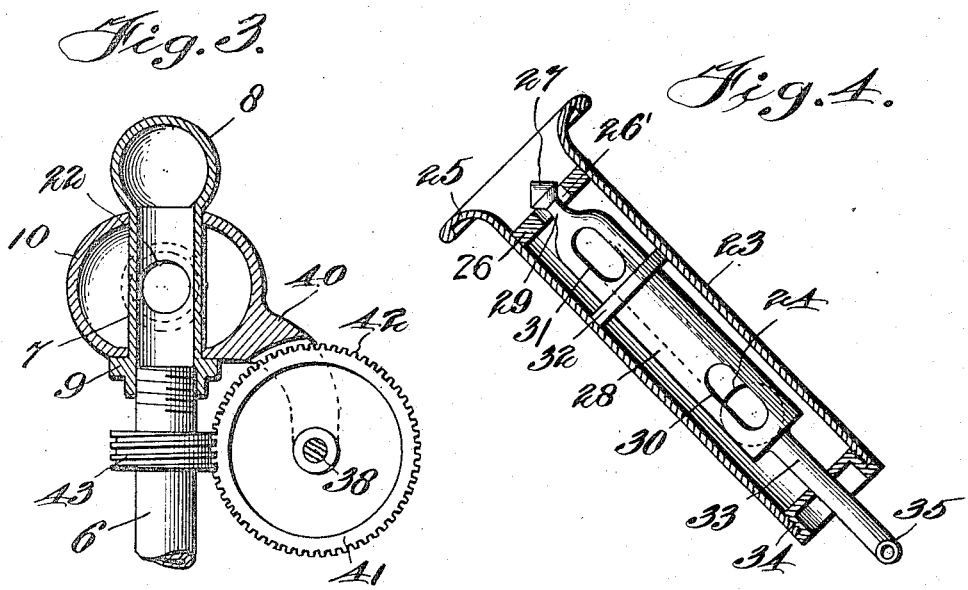
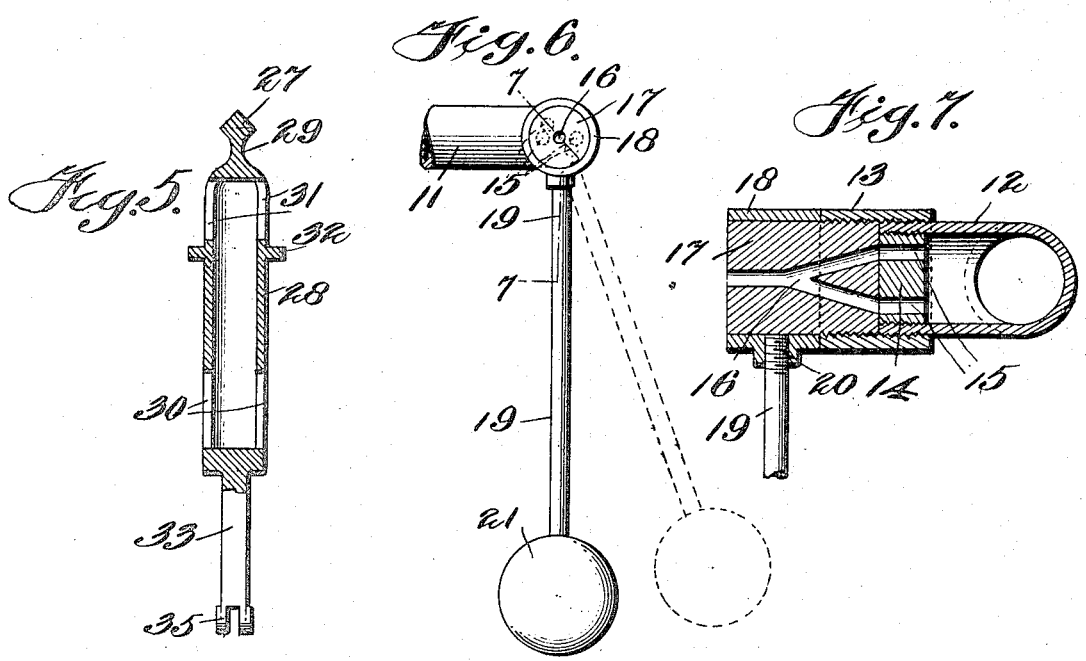

UNITED STATES PATENT OFFICE.

FRIEDRICH C. STETTER, OF ATTLEBORO, MASSACHUSETTS.

AUTOMATIC LAWN-SPRINKLER.

1,146,663.  Specification of Letters Patent.  Patented July 13, 1915.

Application filed November 9, 1914. Serial No. 871,059.

*To all whom it may concern:*

Be it known that I, FRIEDRICH C. STETTER, a subject of the Emperor of Germany, residing at Attleboro, in the county of Bristol and State of Massachusetts, have invented certain new and useful Improvements in Automatic Lawn-Sprinklers; and I do hereby declare the following to be a full, clear, and exact description of the invention, such as will enable others skilled in the art to which it appertains to make and use the same.

This invention comprehends certain new and useful improvements in lawn sprinklers and has for its primary object to provide an automatic lawn sprinkler which will be of improved and simplified construction and operation as well as highly efficient in use and in which the main or central spraying nozzle will be mounted upon a rotary member or cross pipe and will be automatically operated to vary the size and character of the stream of fluid leaving the same.

The invention has for another object to provide a lawn sprinkler of this character which will be of such construction and operation that the water passing through the same will cause the cross pipe mounted upon the tripod stand to rotate and carry around the main spraying nozzle and the outer spraying nozzles and governors, the governors serving to open and close the outer spraying nozzles to regulate the pressure of the fluid fed to the main or central spraying nozzle and at the same time control the speed of rotation of the cross pipe, the cross pipe carrying means for engagement with the worm upon the standard to reciprocate the plunger of the main or central nozzle and thereby continually change the character and volume of the stream leaving the main or central spraying nozzle, during use of the device.

The invention has for a still further object to generally improve and simplify the construction and operation of devices of this character and provide a sprinkler which will evenly and quickly sprinkle or water a large area around the same in each direction.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1:
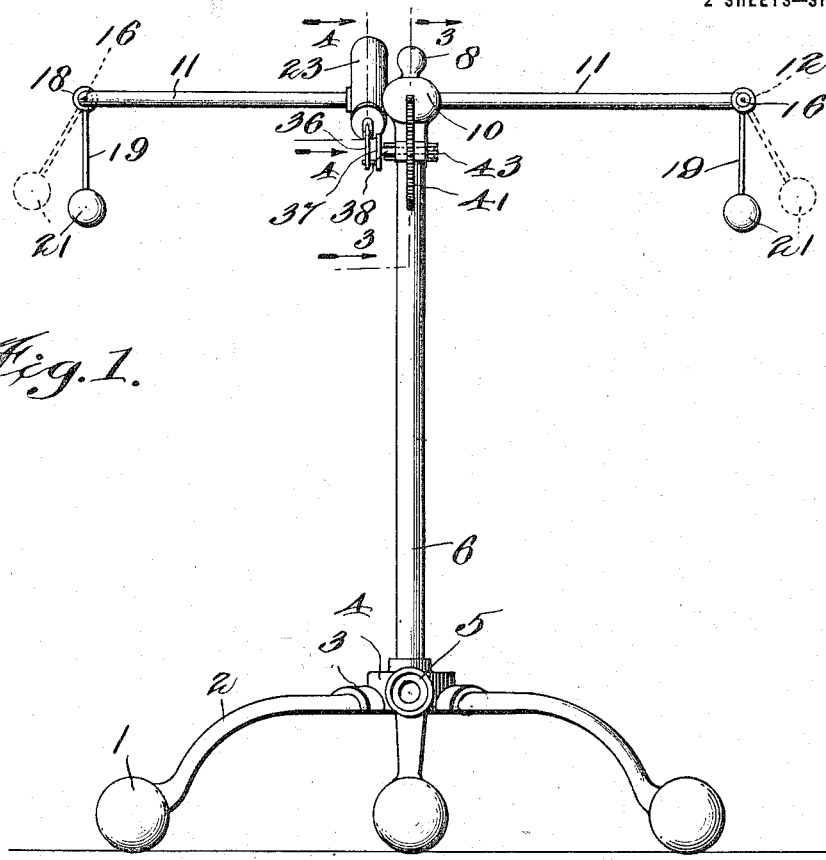
Figure 2:
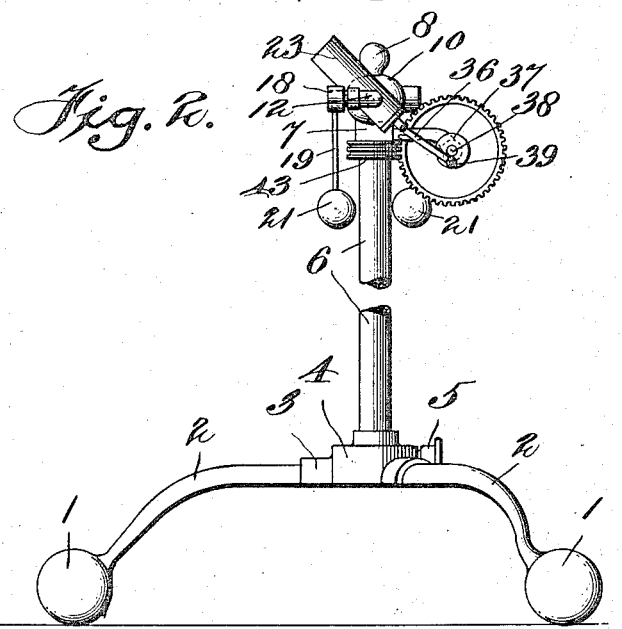

Figure 1 is a side elevation of the complete device, Fig. 2 is a side elevation at right angles to Fig. 1, Fig. 3 is an enlarged detail section on the plane of line 3—3 of Fig. 1, looking in the direction indicated by the arrow, Fig. 4 is an enlarged detail section on the plane of line 4—4 of Fig. 1, Fig. 5 is an enlarged detail longitudinal section of the plunger of the main nozzle, Fig. 6 is an elevation of one end of the revolving cross pipe, and Fig. 7 is an enlarged detail section substantially on the plane of line 7—7 of Fig. 6.

Referring in detail to the drawings by numerals, 1 designates the balls formed on the lower ends of the downwardly curved legs 2 of the tripod stand which are connected at their upper ends to the radially directed concavo-convex flanges 3 of the hollow base 4, with which is connected the hose, not shown, by means of the nipple 5 loosely mounted upon the flanged neck projecting from one side of the hollow base 4, between two of the legs 2.

Extending upwardly from the hollow base 4 is the upstanding feed pipe 6, upon the upper end of which is removably secured in any suitable manner a hollow bearing 7 having a head 8 formed on its upper end. The bearing 7 is shown as being threaded upon the upper end of the upstanding feed pipe 6, but it may be secured upon the same in any suitable and well known manner. The stationary bearing 7 also has a lower flange 9 adjacent its lower end and rotatably mounted upon said bearing 7 between the head 8 and flange 9 thereof is a revolving hollow casting 10 in the opposite sides of which are secured the inner ends of the oppositely directed sections or halves of the revolving transverse pipe 11, the outer ends of which sections of the transverse pipe 11 are turned at right angles and in opposite directions, as indicated at 12, and suitably threaded exteriorly to receive interiorly threaded collars 13. The ends 12 are also interiorly threaded to receive the small nozzle disk 14 provided with spaced transverse discharge openings 15 with which are adapted to register at times the inner ends of the Y-shaped passages 16 extended through the plugs 17 which are threaded in the collars 13, and project a short distance beyond the same. Positioned around the plugs 17 are sleeves 18 which are adapted to be secured against independent movement, by the inner ends of the governor rods 19 which are threaded through suitable bearing openings 20 in said sleeves 18 and are provided upon their lower ends with the balls or weights 21 to normally retain said governor rods 19 in perpendicular or vertical position with the inner ends of the Y-shaped passages 16 communicating with and registering with the transverse passages 15.

It will be understood that communication between the hollow bearing 7 and the hollow rotatable casting 10 is formed by suitable passages 22 which are formed in opposite sides of said hollow bearing 7, thereby permitting water from the upstanding feed pipe 6 to enter the sections of the transverse rotary pipe 11 and pass therethrough to the auxiliary or small nozzles mounted upon the oppositely turned outer ends of the sections of said transverse revolving pipe 11, and just described in detail, the water, as it leaves the outer ends of the Y-shaped passages 16 of the plugs 17 of the outer auxiliary small nozzles, serving to force the pipe 11 to revolve upon the stand. As the speed of rotation of the pipe 11 upon the stand increases, however, the balls or weights 21 of the governors will slide outwardly and thereby positively close the outer or auxiliary small nozzles by moving the inner ends of the Y-shaped passages 16 away from alinement with the transverse discharge openings 15 of the disks 14, thereby automatically reducing the pressure and the speed of rotation of the transverse pipe 11.

A main or large nozzle is provided at the inner end of one section of the transverse pipe 11 and the barrel 23 of said main nozzle is positioned between the inner ends of said section of the pipe 11 and the hollow casting 10, as clearly shown in the drawings, a suitable transverse passage 24 being formed in said barrel adjacent its inner end, whereby the water from the upstanding feed pipe 6 may pass into and through said barrel 23.
The outer end of the barrel 23 is flared or turned outwardly, as shown at 25, and a flange 26 is formed in the barrel 23 adjacent its outer end and provided with a central passage through which the head 27 of the hollow nozzle plunger 28 is adapted to be adjusted to regulate the stream of water passing from the flared or outwardly turned end 25 thereof and vary said stream so that the surface surrounding the device for some distance in each direction will be evenly sprinkled or watered without danger of the water being deposited principally in one or two spots. It will be understood that the head 27 is solid and is substantially diamond shape in elevation or plan and is mounted upon the outer end of the neck portion 29 extending forwardly from the body of the hollow plunger 28, while the hollow body of the plunger 28 has a pair of inlet passages 30 adjacent its inner or rear end and a pair of outlet openings or passages 31 adjacent its outer end and forwardly of the guide flange 32 formed around said hollow body portion of the plunger 28 to guide the same during its reciprocating movement in the barrel 23, and it will be evident that the position of the head 27 with respect to the opening 26' will control the amount of water passing outwardly through said central opening 26' of the flange 26 as well as the character of the stream or spray of water leaving the barrel 23 by way of the flared or outwardly turned end 25 thereof.

The plunger 28 has a stem 33 projecting from the closed rear end of the body portion of said plunger 28 and extending through a cap 34 employed for closing the rear end of the barrel 23, said stem 33 having a bifurcated rear end 35 within which is pivoted one end of the pitman arm 36, which has its opposite end pivoted eccentrically to the disk 37 mounted upon the shaft 38, by means of the eccentric pin 39 projecting from one side of said disk 37. The shaft 38 is mounted in the lower end of a suitable bracket arm 40 carried by and preferably formed with the hollow casting 10 and a gear wheel 41 is mounted upon said shaft 38 within the lower bifurcated end of said bracket arm 40 and has peripheral teeth 42 which are engaged with a worm gear 43 rigidly mounted upon the upstanding feed pipe 6, a spaced distance below the hollow casting 10 so that upon rotation of the transverse pipe 11 upon the stand, the worm gear 43 will cause a rotation of the gear wheel 41 about the distance of one tooth to each revolution of the hollow casting 10 and thereby slowly and gradually reciprocate the plunger 28 of the main discharge nozzle so that the character of the stream or spray of water emanating from said main nozzle will be continually changed and varied as well as the volume of water passing from said main nozzle, during operation of the device, assuring a thorough sprinkling or watering of the entire surface surrounding the device as far in each direction as the water can be thrown by the main nozzle, and it will be evident that this will be governed to some extent by the pressure of the water within the upstanding feed pipe 6.

From the foregoing it will be readily apparent that I have provided a sprinkler which will thoroughly and evenly sprinkle or water a large area in each and every direction from the sprinkler, and the governors will not only govern the speed of rotation of the cross pipe by which the main or central nozzle and auxiliary or end nozzles are carried, but will also serve to regulate the openings of the auxiliary or end nozzles and the amount of water passing out of the cross pipe by way of said auxiliary or end nozzles, thereby automatically reducing the water pressure upon the auxiliary or end nozzles and increasing the water pressure upon the main or central nozzle, thereby making it possible to direct the spray of water for a great distance from said nozzle.

While I have shown and described the preferred embodiment of my invention, it will be understood that minor changes in the details of construction, combination and arrangement of parts may be made without departing from the spirit and scope of the invention as claimed or sacrificing any of the advantages thereof.

What is claimed is:—

1. A sprinkler including a hollow member, a rotary member mounted upon said hollow member and having communication with the interior thereof, a main spraying nozzle carried by said rotary member and including a plunger, and means adapted to be operated upon rotation of the rotary member to reciprocate the plunger of the spraying nozzle and thereby control the character and volume of the spray discharged from the same.

2. A sprinkler including a stand, a hollow base forming a portion of said stand, a hollow member extending upwardly from said hollow base, a hollow casting mounted upon said hollow member, said hollow casting having communication with the interior of said hollow member and adapted to rotate upon the same, a cross pipe carried by said hollow casting and extended in opposite directions, the outer ends of said cross pipe being turned in opposite directions, spraying nozzles mounted upon said turned outer ends of the hollow pipe, means mounted upon said spraying nozzles to control the size of the discharge openings thereof and thereby regulate the speed of rotation of the hollow pipe, a main discharge nozzle carried by said hollow pipe, and means connected with said main discharge nozzle for varying the character and volume of the spray of fluid discharged from the same during rotation of the hollow pipe and thereby assure an even distribution of the fluid to the entire surface around the sprinkler for a limited distance in each direction.

In testimony whereof I affix my signature in presence of two witnesses.

FRIEDRICH C. STETTER.

Witnesses:
 JOHN CAMPBELL,
 WILFRED A. LORD.